(12) United States Patent
Cope, III et al.

(10) Patent No.: US 6,347,643 B1
(45) Date of Patent: Feb. 19, 2002

(54) GAS OUTLET BARREL RETENTION APPARATUS

(75) Inventors: Robert L. Cope, III, Lawrenceville; David M. Garner, Cumming, both of GA (US); Eric R. Colburn, Wexford, PA (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 09/701,621

(22) PCT Filed: Jun. 21, 1999

(86) PCT No.: PCT/US99/13973
§ 371 Date: Dec. 1, 2000
§ 102(e) Date: Dec. 1, 2000

(87) PCT Pub. No.: WO99/66968
PCT Pub. Date: Dec. 29, 1999

Related U.S. Application Data

(60) Provisional application No. 60/090,553, filed on Jun. 24, 1998.

(51) Int. Cl.[7] ................................................ F16L 5/00
(52) U.S. Cl. .............................. 137/329.4; 137/329.1; 137/360
(58) Field of Search ................. 137/329.1, 329.4, 137/360

(56) References Cited

U.S. PATENT DOCUMENTS

| | | |
|---|---|---|
| 2,905,487 A | 9/1959 | Schifter |
| 3,003,213 A | 10/1961 | Rogers |
| 3,036,814 A * | 5/1962 | Stevens |
| 3,287,031 A | 11/1966 | Simmons et al. |
| 3,448,760 A | 6/1969 | Cranage |
| 3,563,267 A | 2/1971 | Thompson |
| 3,565,103 A * | 2/1971 | Maselek |
| 3,643,985 A | 2/1972 | Cranage |
| 3,661,356 A * | 5/1972 | Tucker ........................ 251/299 |
| 3,776,272 A | 12/1973 | Arbon |
| 3,931,829 A | 1/1976 | McWhinnie, Jr. et al. |
| 4,150,673 A | 4/1979 | Watt |
| 4,190,075 A | 2/1980 | Kayser |
| 4,290,853 A | 9/1981 | Gigou |
| 4,344,455 A | 8/1982 | Norton et al. |
| 4,354,523 A | 10/1982 | Hochmuth et al. |
| 4,509,554 A | 4/1985 | Failla |
| 4,527,587 A | 7/1985 | Fairlamb |
| 4,562,856 A | 1/1986 | Garvey et al. |
| 4,572,232 A | 2/1986 | Gruber |
| 4,591,298 A | 5/1986 | Fukumori et al. |
| 4,617,012 A | 10/1986 | Vaillancourt |
| 4,683,905 A | 8/1987 | Vigneau et al. |
| 4,718,699 A | 1/1988 | Kulish et al. |
| 4,774,939 A | 10/1988 | Disney |
| 4,790,567 A | 12/1988 | Kawano et al. |
| 4,844,409 A | 7/1989 | Lackler et al. |
| 4,915,132 A | 4/1990 | Hodge et al. |
| 5,129,423 A | 7/1992 | Fournier et al. |
| 5,131,429 A | 7/1992 | Nixon |
| 5,197,511 A | 3/1993 | Kohn et al. |
| 5,217,203 A | 6/1993 | Cattini |

(List continued on next page.)

Primary Examiner—A. Michael Chambers
(74) Attorney, Agent, or Firm—Barnes & Thornburg

(57) ABSTRACT

A gas outlet apparatus (10) is configured to provide a medical gas outlet for a gas supply line (62). The apparatus (10) includes a front cover (12) formed to include a gas outlet opening (14), a back plate (24) coupled to the front cover (12), and a gas outlet barrel (30) having an inlet end, an outlet end (80), and a valve located between the inlet end and the outlet end (80). The apparatus (10) also includes a retention portion located on the back plate (24). The retention portion is configured to engage the barrel (30) adjacent the outlet end (80) to secure the barrel (30) to the back plate (24) and the cover (12) and with the outlet end (80) of the barrel (30) in alignment with the gas outlet opening (14) formed in the front cover (12).

30 Claims, 7 Drawing Sheets

U.S. PATENT DOCUMENTS

| | | | |
|---|---|---|---|
| 5,236,005 A | * 8/1993 | Berg | 137/360 |
| 5,293,913 A | 3/1994 | Preszler | |
| 5,333,644 A | 8/1994 | Heyden et al. | |
| 5,353,837 A | 10/1994 | Faust | |
| 5,368,065 A | 11/1994 | Humpert et al. | |
| 5,562,121 A | 10/1996 | Hodges et al. | |

* cited by examiner

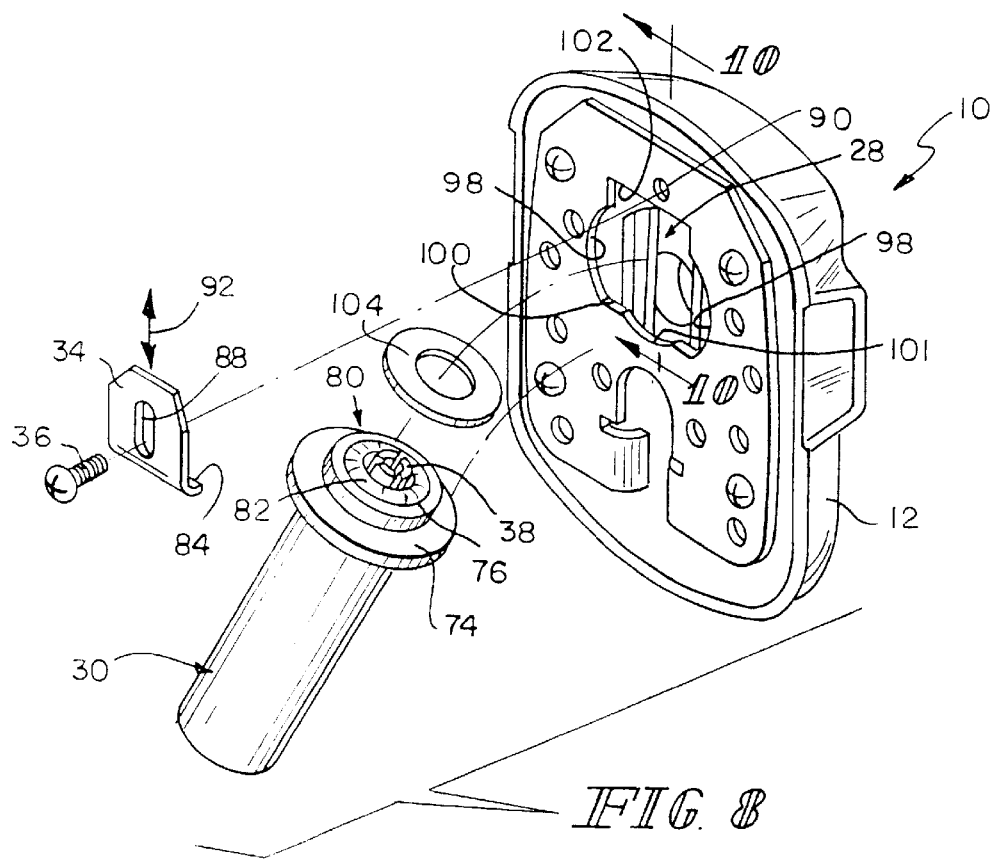
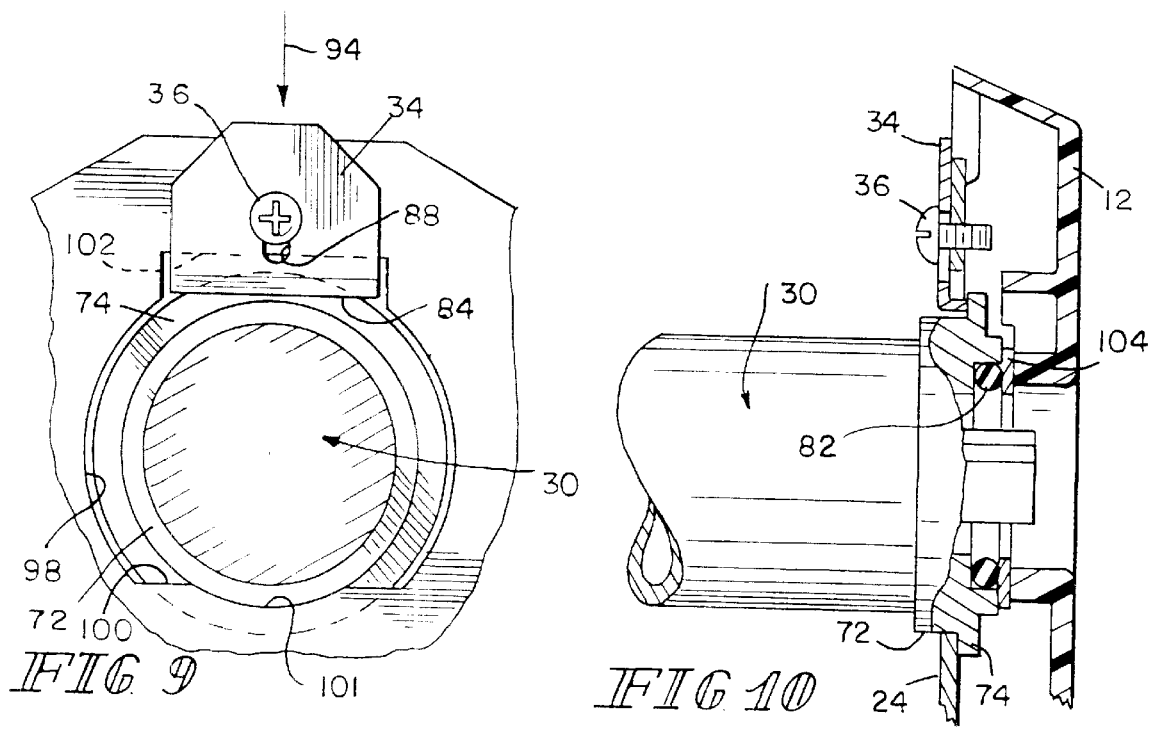

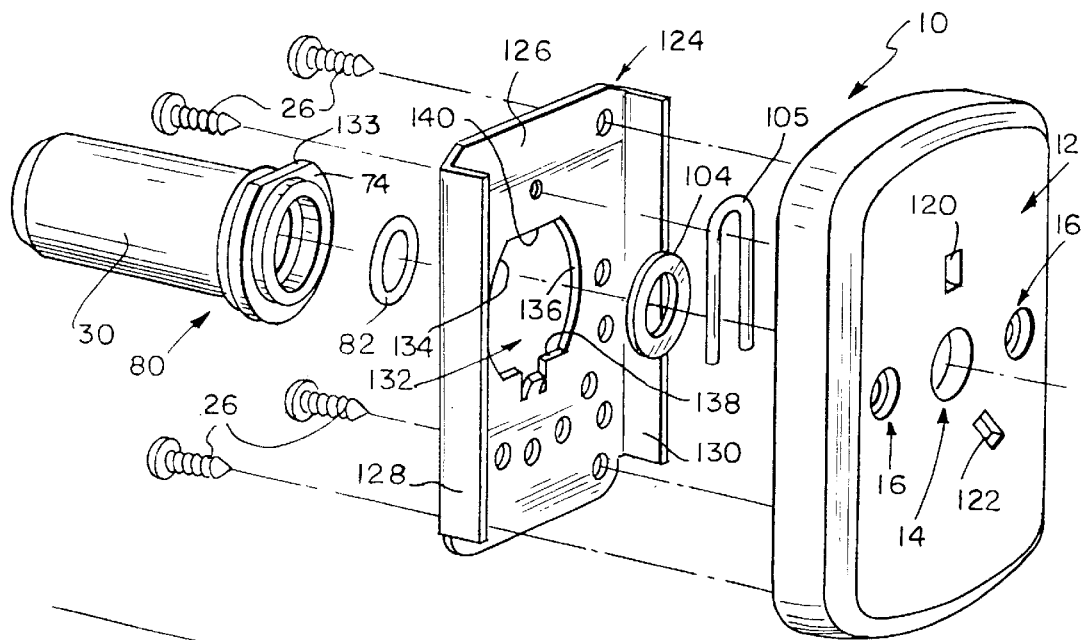
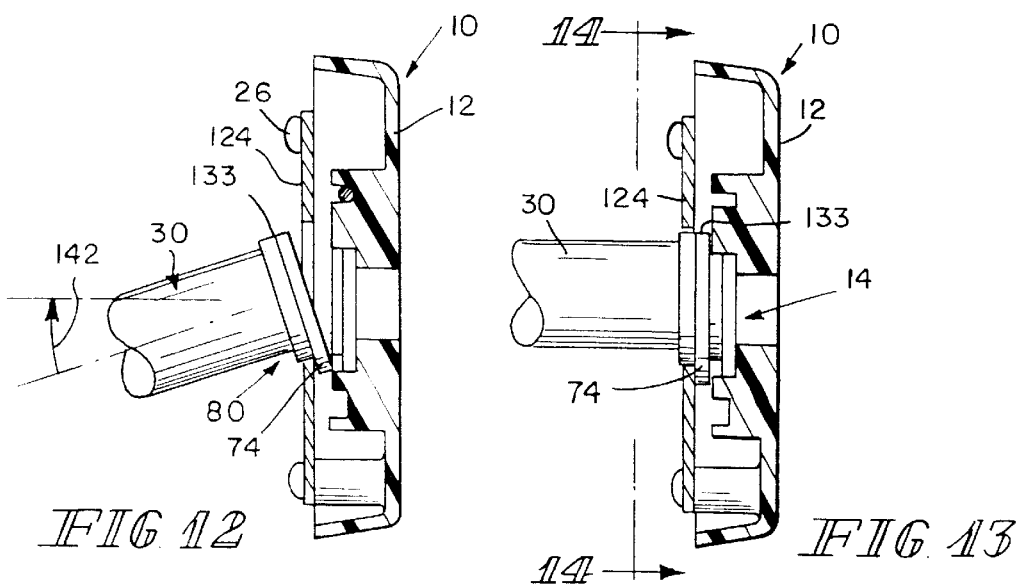

US 6,347,643 B1

GAS OUTLET BARREL RETENTION APPARATUS

CROSS-REFERENCES TO RELATED APPLICATIONS

This application is a U.S. national counterpart application of international application Ser. No. PCT/US99/13973 filed Jun. 21, 1999, which claims priority to U.S. provisional application Ser. No. 60/090,553 filed Jun. 24, 1998.

BACKGROUND AND SUMMARY OF THE INVENTION

The present invention relates to a gas outlet for supplying a gas to a room. More particularly, the present invention relates to an improved gas outlet front body which facilitates maintenance or servicing of the gas outlet.

It is known to provide a pressurized gas supply to gas outlets in a room. In medical treatment facilitates, gases such as oxygen, nitrous oxide, air, carbon dioxide, and nitrogen are supplied to the room through a wall panel or ceiling outlet. It is known to provide detachable adapters which mate with gas outlets to provide gas specific connectors. Such known gas outlet systems typically include a front body having a valve or barrel configured to be coupled to a back body assembly which is coupled to a gas supply line extending from a wall, headwall, or ceiling.

The valve or barrel of the front body must be removed and serviced to replace worn parts from time to time. In particular, O-ring seals within the barrel must be replaced in order to maintain acceptable sealing against gas flow. It is known to provide removable barrels from front bodies in order to permit servicing. However, removal of the conventional barrels is difficult and requires removal of several parts. These loose parts may be dropped, lost or misplaced.

The gas outlet of the present invention provides an improved latching or retention mechanism for coupling the barrel to the front body. The apparatus of the present invention permits quick detachment of the barrel from the front body for servicing, without removing fasteners or other parts from the front body which can then be lost or misplaced.

Additional features of the invention will become apparent to those skilled in the art upon consideration of the following detailed description of the illustrated embodiments exemplifying the best mode of carrying out the invention as presently perceived.

BRIEF DESCRIPTION OF THE DRAWINGS

The detailed description particularly refers to the accompanying figures in which:

FIG. 8 is a perspective view of another embodiment of the present invention illustrating the latch and the barrel removed from the front body;

FIG. 9 is a rear view further illustrating operation of the latch mechanism;

FIG. 10 is a partial sectional view taken along lines 10—10 of FIG. 8 further illustrating the connection of the barrel to the front body assembly;

FIG. 11 is an exploded perspective view of another embodiment of a front body including a front cover, a back plate, and a valve or barrel configured to be coupled to the front body;

FIG. 12 is a sectional view taken through the front body of FIG. 11 illustrating insertion of the barrel into the front body;

FIG. 13 is a sectional view similar to FIG. 12 in which the barrel has been pivoted upwardly so that the flange of the barrel is located behind the back plate of the front body;

DETAILED DESCRIPTION OF THE DRAWINGS

Figure 1:
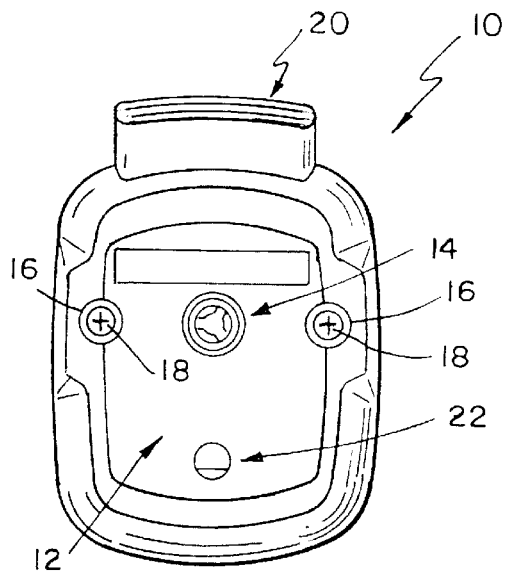
FIG. 1 is a front view of a front body of a gas outlet system of the present invention.
Figure 2:
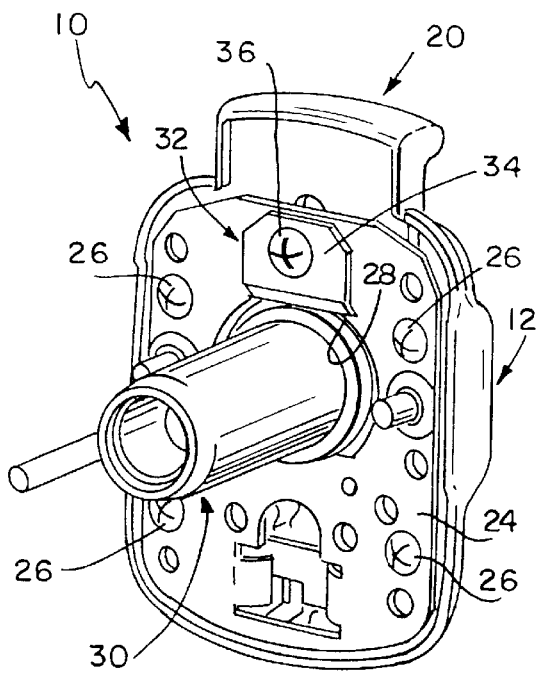
FIG. 2 is a perspective rear view of the front body of FIG. 1.

Referring now to the drawings, FIGS. 1 and 2 illustrate a front body 10 of a gas outlet system. Front body 10 includes a front cover 12 having a gas outlet opening 14 and spaced apart apertures 16 for receiving fasteners 18. A release button 20 is coupled to the front cover 12. A keying aperture 22 is also formed in the front cover 12. Keying aperture 22 mates with a projection 50 on a particular type of probe assembly 44, illustratively an Allied probe. For an outlet having a different type of keying system, another configuration of front body assembly is used. The present invention is not limited to Allied keying. It is understood that the front body 10 may be keyed to receive any type of probe, including a Puritan-Bennett probe, a DISS barrel, etc.

FIG. 2 illustrates a back plate 24 coupled to the front cover 12 by fastener 26. The back plate 24 is formed to include an aperture 28 configured to receive an end 80 of a valve or barrel 30. A latch or retention mechanism 32 is provided to secure the barrel 30 to the back plate 24. Latch mechanism 32 illustratively includes a latch plate 34 and fastener 36 which is coupled to the back plate 24. Details of the latch mechanism 32 and coupling of barrel 30 to back plate 24 will be discussed below with reference to FIGS. 6–10.

The barrel 30 illustratively includes a primary piston 38, a secondary piston 40, and an O-ring seal 42. When no probe is inserted into the front body 10, O-ring seal 42 on secondary piston 40 blocks gas flow through the barrel 30. Primary piston 38 serves as a dust plug and spacer to ensure that there is no gas flow through the barrel 30, unless a proper probe is inserted.

Figure 3:
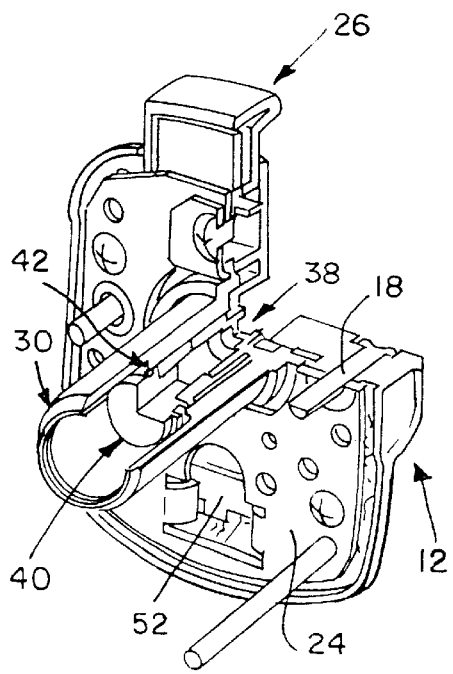
FIG. 3 is a partial sectional view of the front body of FIG. 2 illustrating operation of a valve or barrel of the front body.
Figure 4:
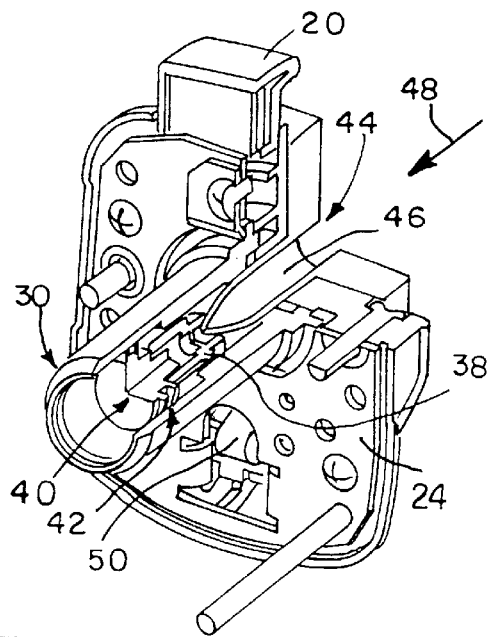
FIG. 4 is a perspective rear view with portions broken away illustrating insertion of a probe into the barrel to provide gas flow.

FIG. 4 illustrates insertion of a probe 44 into aperture 14 of front body 12. Probe 44 includes a central projection 46 which enters aperture 14 and moves primary piston 38 in the direction of arrow 48 as shown in FIG. 4. Probe 44 also includes a keying projection 50 which enters keying aperture 22. As shown in FIGS. 3 and 4, the keying projection 50 is locked in position by a plate 52. Downward movement of release button 20 causes downward movement of plate 52 to release the projection 50 of probe 44. When the proper probe is inserted as shown in FIG. 4, the nose of probe projection 46 moves the primary piston 38 in the direction of arrow 48. Movement of the primary piston 38 causes movement of the secondary piston 40 and of the O-ring seal 42 away from a valve seat to permit gas to flow through the barrel 30 and into the probe projection 46.

Figure 5:
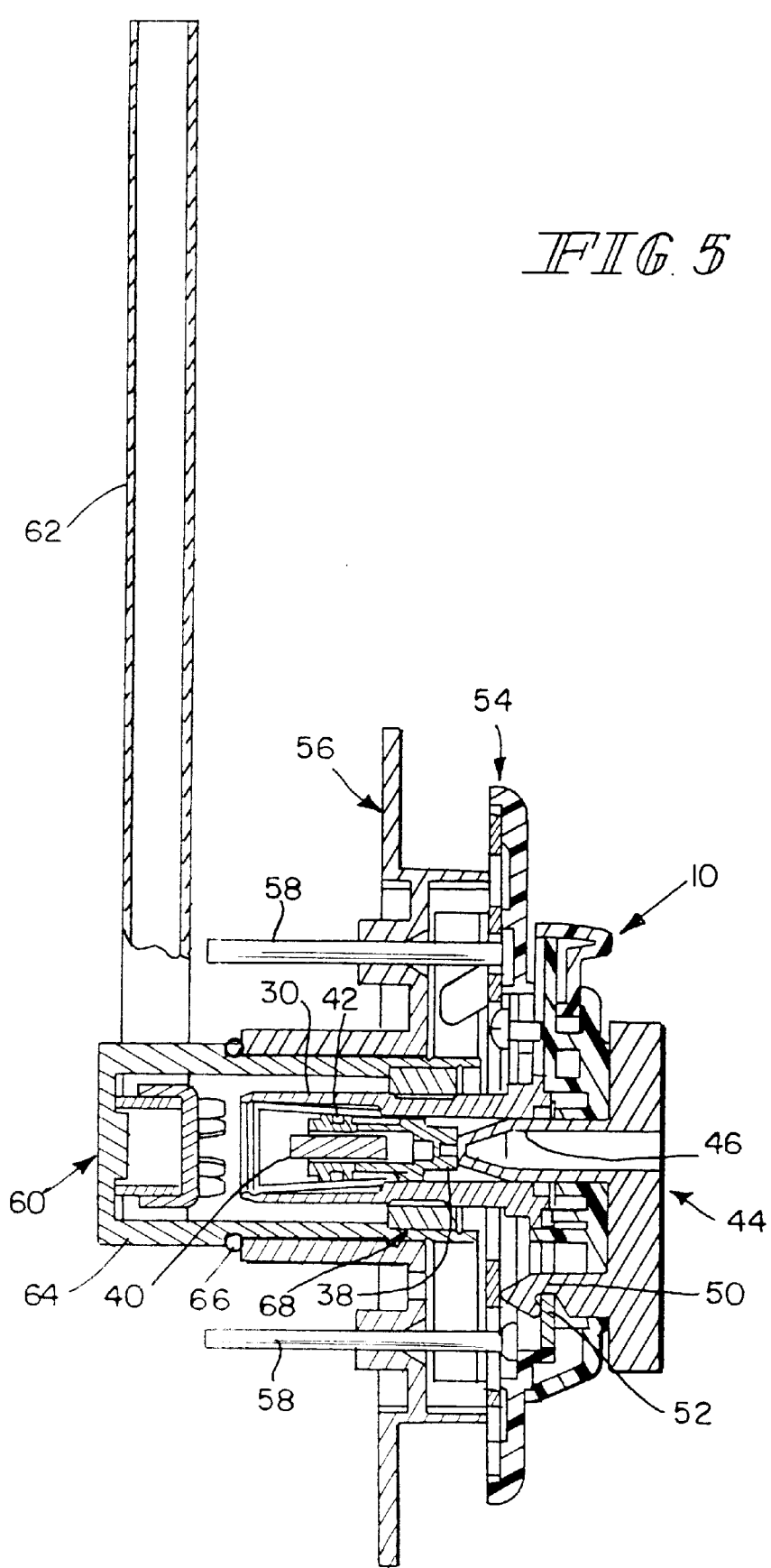
FIG. 5 is a sectional view illustrating the front body of FIG. 1–4 coupled to a back body assembly.

FIG. 5 illustrates further details of the gas outlet assembly in which the front body 10 is coupled to a face plate 54. If the face plate 54 is plastic, then the face plate 54 is coupled to a steel backing plate 56 with suitable fasteners 58. If the face plate 54 is made from metal, such as zinc diecast, steel backing plate 56 is not required. A back body assembly 60 is coupled to the front body assembly 10 as shown. A gas supply line 62 is coupled to back body assembly 60. Back body assembly 60 includes a cylindrical pipe 64, a O-ring seal 66, and a bushing 68 which seals the pipe 64 of back body assembly 60 to the barrel 30 of front body assembly 10.

As discussed above, different types of front bodies may be used depending upon the type of connection desired. In addition, the back body assembly may be changed for different types of rear connections. The front body 10 can also be connected to a ¼ NPTM check unit, a DISS connection, a hose barb connection, copper tube connections, or any other desired connection.

The improved latch mechanism 34 for the barrel 30 is best illustrated in FIGS. 6–10. As discussed above, it is understood that the latch mechanism 34 may be used with any desired type of gas outlet and is not limited to the particular configuration of the front body 10.

Figure 6:
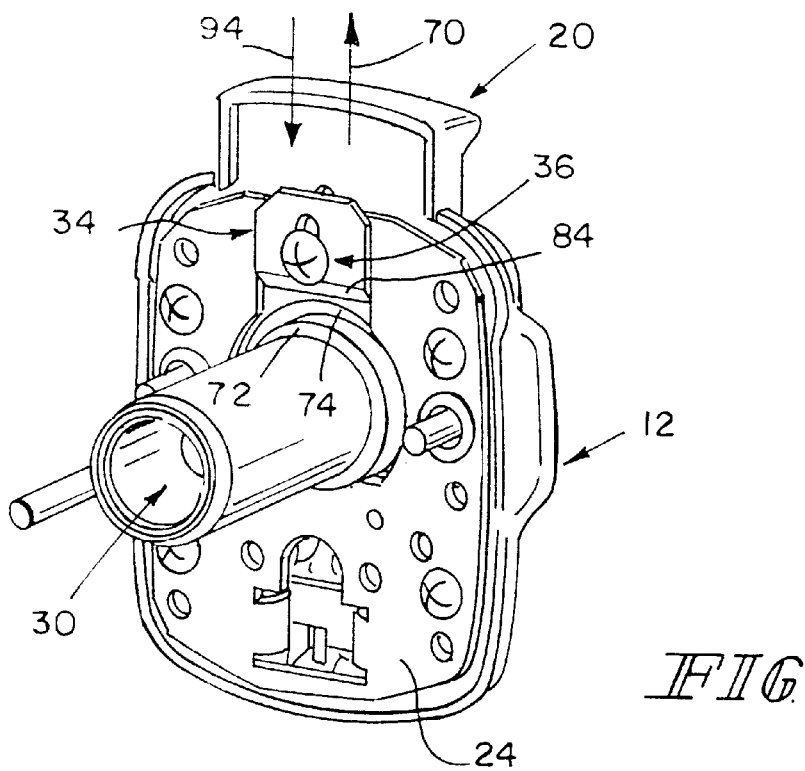
FIG. 6 is a perspective view similar to FIG. 2, illustrating movement of a latch mechanism to release the barrel from the front body.

When it is desired to remove the barrel 30 for servicing, the fastener 36 is loosened so that the latch plate 34 can slide upwardly in the direction of arrow 70 in FIG. 6. As shown in FIGS. 7–10, the barrel 30 includes an annular ring 72 and a flange 74 having a larger diameter than the annular ring 72 adjacent an end 80 of barrel 30. An annular ring 76 is also formed on end 80 of barrel 30 as shown in FIG. 8. An O-ring seal 82 is located within annular ring 76 surrounding primary piston 38.

Latch plate 34 is formed to include an inwardly projecting edge 84 configured to engage flange 74 of barrel 30 to retain the barrel 30 within the front body 10. Once the latch plate 30 is moved upwardly in the direction of arrow 70 past the flange 74 as illustrated in FIG. 6, the barrel 30 can be pivoted downwardly relative to the back plate 24 to an angle 86 and then removed from the back plate 24 for servicing of components within the barrel 30.

Further details of the latch mechanism are illustrated in FIGS. 8–10. The latch plate 34 includes an elongated slot 88. Fastener 36 extends through the elongated slot 88 into a threaded aperture 90 formed in back plate 24. It is understood that a threaded aperture for receiving fastener 36 may also be formed in cover 12 if desired. Elongated slot 88 permits the latch plate 34 to move up and down in the direction of double-headed arrow 92 of FIG. 8 without removal of the fastener 36. Therefore, the fastener 36 and latch plate 34 remain coupled to the front body 10 during removal of the barrel 30 to reduce the likelihood that the parts will be lost or misplaced.

It is understood that other types of securing or retention mechanisms may be used to hold the barrel 30 on the back body assembly 10. For instance, a spring biased member may be used to hold the barrel 30 downwardly into the locked position of FIG. 10. Such spring biased member may be used with or without a separate fastener for securing the barrel 30 to the front body 10. Other types of sliding coupling mechanisms may also be used. In addition, a bayonet-type connection of barrel 30 may be used. In this instance, the barrel 30 has a nonsymmetrical flange which is inserted into a nonsymmetrical opening formed in back plate 24 and then rotated so that flanges on the barrel cannot be removed from back plate 24 without rotating the barrel 30 as discussed below with reference to FIGS. 11–17.

FIGS. 9 and 10 illustrate that inwardly projecting edge 84 of latch plate 34 overlaps and engages flange 74 of barrel 30 when latch plate 34 is moved downwardly in the direction of arrow 94. Once the latch plate 34 engages the flange 74, fastener 36 is tightened to secure the barrel 30 in the locked position.

Plate 24 is formed to include an aperture 28 for receiving end 80 of barrel 30. The aperture includes outer side portions 98 which have a diameter substantially equal to a diameter of flange 74. A lip portion 100 is configured to engage a bottom portion of flange 74 to hold the barrel 30 on the front body 10 as best illustrated in FIGS. 9 and 10. In other words, the flange 74 is locked behind the plate 24 by lip 100. Lip 100 includes a curved notch 101 configured to engage annular ring 72. Top surface 102 of aperture 96 provides room for inwardly projecting edge 84 of latch plate 34 to move. FIGS. 8 and 10 illustrate a washer 104 configured to be inserted into the front body 10 prior to barrel 30. Washer 104 provides a sealing surface for O-ring 82 as best illustrated in FIG. 10. It is understood that the cover 12 may be formed to include an appropriate sealing surface so that washer 104 is not required.

Figure 7:
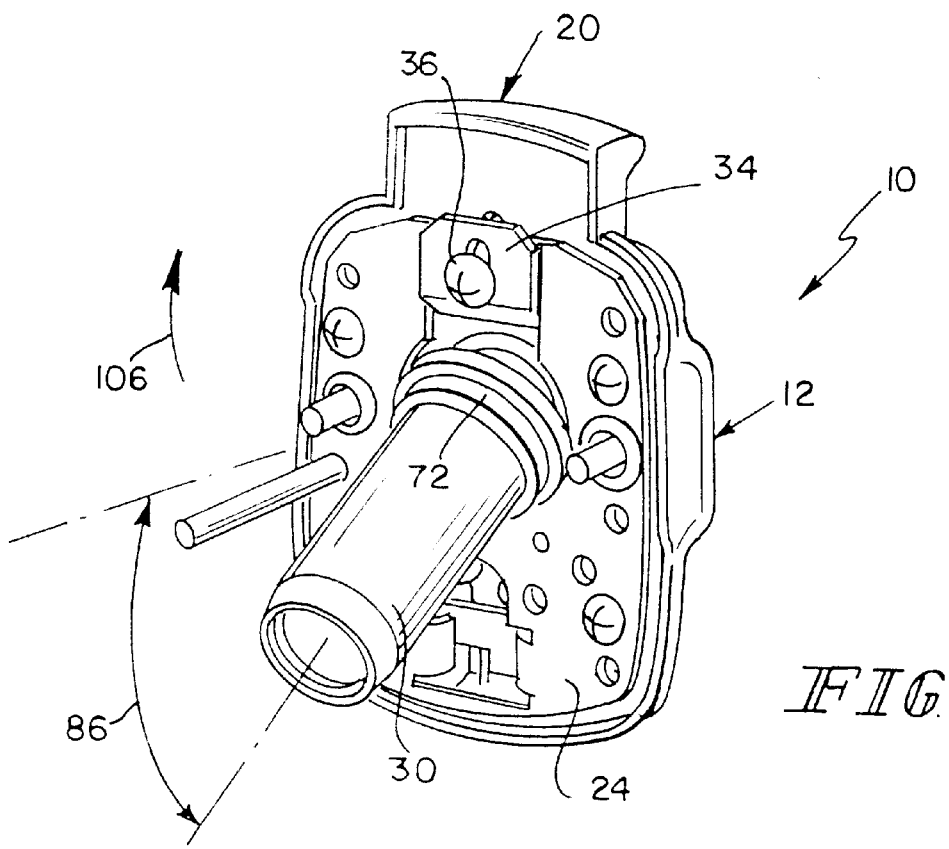
FIG. 7 is a perspective view similar to FIG. 6 illustrating removal of the barrel from the front body.

In operation, when it is desired to load a barrel 30 into the front body 10, the barrel 30 is tilted at an angle as illustrated in FIG. 7 and flange 74 is positioned within aperture 28 behind lip 100. Barrel 30 is then rotated upwardly in the direction of arrow 106 of FIG. 7 with the latch plate 34 moved upwardly in the direction of arrow 70. Once the barrel 30 is in the position of FIG. 6, latch plate 34 is moved downwardly in the direction of arrow 94 to the position shown in FIGS. 2, 9 and 10 so that edge 84 overlaps flange 74. Fastener 36 is then tightened to hold the inwardly extending edge 84 against flange 74 of barrel 30 to secure the barrel 30 to the front body 10. These steps are reversed in order to remove the barrel 30 from the front body assembly 10 for servicing.

Another embodiment of the present invention is illustrated in FIGS. 11–16. Those elements referenced by numbers same as FIGS. 1–10 provide the same or similar function. Front body 12 includes a gas outlet 14 and keying apertures 120 and 122 formed in front cover 12. A back plate 124 includes a rear panel 126 and side walls 128 and 130. Back plate 124 is configured to be coupled to front cover 12 by fasteners 26. Rear panel 126 of back plate 24 is formed to include a central aperture 132 configured to receive the outlet end 80 of barrel 30. A washer 104 and U-shaped spring clip are located in the front body 10. An O-ring 82 is provided for sealing the barrel 30 as discussed above.

In the embodiment of FIGS. 11–16, the flange 74 of barrel 30 is formed to include a flat surface 133 so that flange 174 is non-symmetrical. Aperture 132 is defined in part by first and second side walls 134 and 136 which are generally arcuate to match the curve of the outer flange 74. Aperture 132 is further defined by a bottom flat wall 138 and a top flat wall 140. Side walls 134, 136 and top flat wall 140 cooperate to define an opening size to receive the flat portion 133 and adjacent curved sections of the flange 74.

Figure 14:
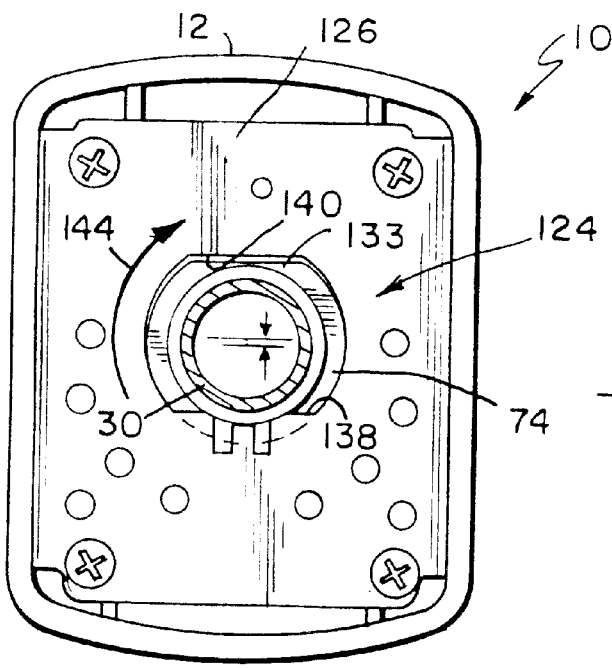
FIG. 14 is a sectional view taken along lines 14—14 of FIG. 13.
Figure 15:
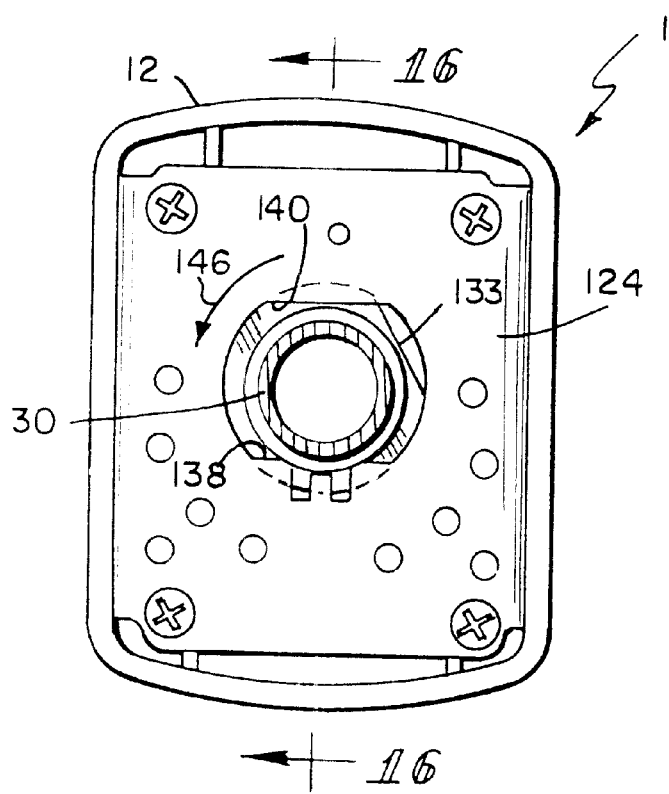
FIG. 15 is a sectional view similar to FIG. 14 in which the barrel has been rotated to couple the barrel to the front body.
Figure 16:
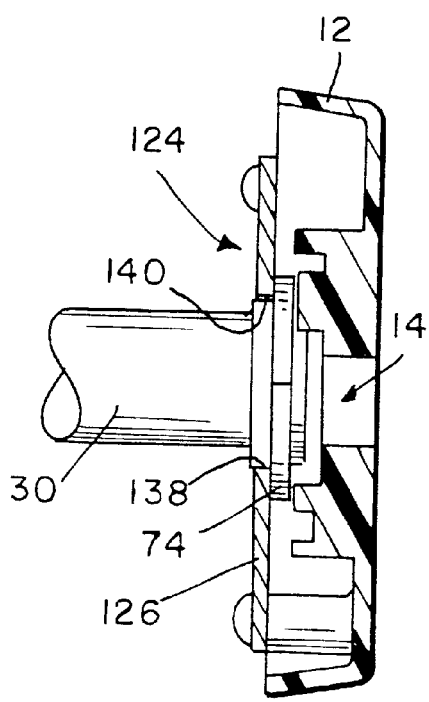
FIG. 16 is a sectional view taken along lines 16—16 of FIG. 15 further illustrating locking of the barrel to the front body.

Installation of the barrel 30 into the back plate 124 is illustrated in the FIGS. 12–16. First, the curved portion of flange 74 is aligned at an angle and positioned behind bottom flat wall 138 as shown in FIG. 12. Next, the flat surface 133 is aligned with the flat side wall 140 and the barrel 30 is rotated upwardly in the direction of arrow 142 of FIG. 12 to the position shown in FIGS. 13 and 14. In the position of FIGS. 13 and 14, the entire flange 74 of barrel 30 is located between back plate 124 and front cover 12. Once the barrel 30 is positioned in the location shown in FIGS. 13 and 14, the barrel is rotated as shown by arrow 144 in FIG. 14. Therefore, the top flat portion 133 of flange 74 rotates to the position shown in FIGS. 15 and 16 to lock the barrel 30 to the back plate 24. In other words, a curved portion of flange 74 rotates upwardly behind the top wall 140 formed in back plate 124 to secure the barrel 30 to the front body 10.

Barrel 30 can be easily removed from the front body 10 for servicing by rotating the barrel in the direction of barrel 146 or continuing rotation of the barrel 30 in the direction of arrow 144 or until the flat 133 on flange 74 is again aligned with the flat wall 140 formed in back plate 124. The barrel 30 can then be pivoted downwardly to a position of FIG. 12 and removed from the front body 10.

Figure 17:
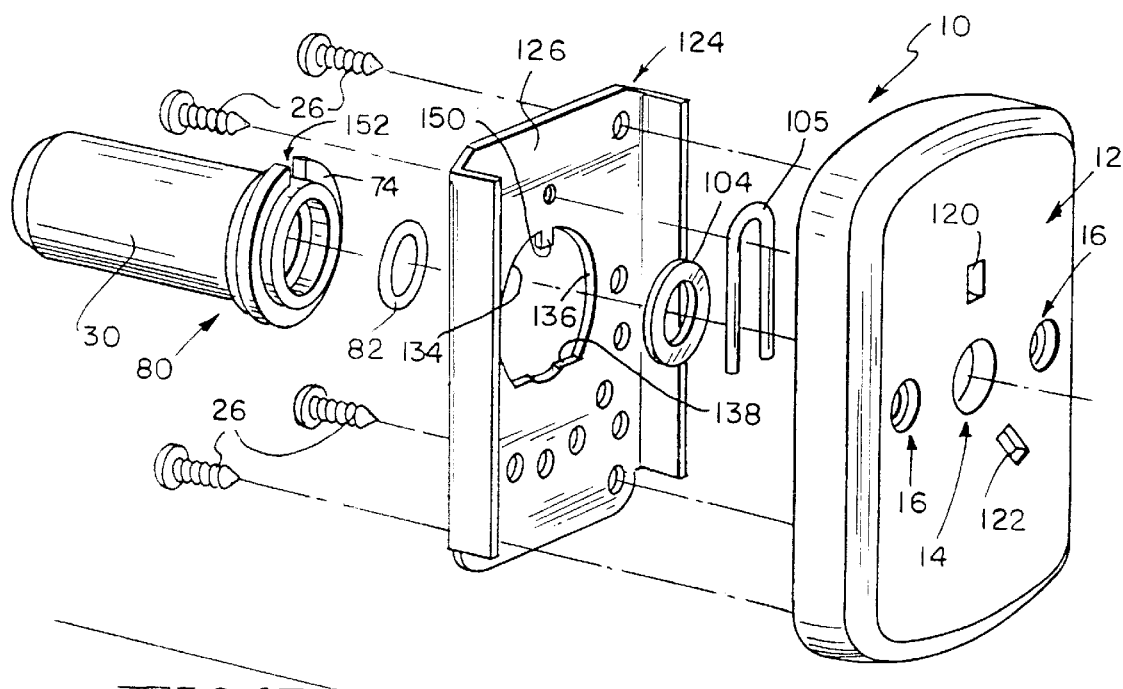
FIG. 17 is an exploded perspective view of yet another embodiment of the present invention illustrating another configured for a back plate and a barrel.

Yet another embodiment of the present invention is illustrated in the FIG. 17. Those elements referenced by numbers the same as FIGS. 1–16 perform the same or similar function. In the FIG. 17 embodiment, the back plate 124 is formed to include a top tab portion 150 spaced apart from bottom flat wall 138. Flange 74 of barrel 30 is formed to include a slot 152 sized slightly larger than tab 150. Therefore, the barrel 30 is installed onto the back plate 124 in a manner similar to the manner described above. The barrel is first aligned with an angle and a portion of the flange 74 is hooked over the bottom flat wall 138. The barrel 30 is then pivoted upwardly with the slot 152 aligned with tab 150 so that the slot 152 passes over the tab 150. After the flange 74 is located between back plate 124 and front cover 12 of front body 10, the barrel 30 is rotated so that the tab 150 engages a portion of the flange 74 to retain the barrel 30 within the front body 10. Barrel 30 can be easily removed from the front body 10 for servicing by rotating the barrel 30 until the slot 152 formed in the flange 74 is aligned with the tab 150 formed in back plate 124. The barrel 30 can then be pivoted downwardly to a position of FIG. 12 and removed from the front body 10.

In all the illustrated embodiments, the barrel 30 can therefore be removed from front body assembly 10 without removal of parts from the front body assembly 10. This reduces the likelihood that parts will be lost or misplaced during servicing or maintenance of the barrel 30.

What is claimed is:

1. A gas outlet apparatus configured to provide a medical gas outlet for a gas supply line, the apparatus comprising:
    a front cover formed to include a gas outlet opening;
    a back plate coupled to the front cover;
    a gas outlet barrel having an inlet end, an outlet end, and a valve located between the inlet end and the outlet end; and
    a retention portion located on the back plate, the retention portion being configured to engage the barrel adjacent the outlet end to secure the barrel to the back plate and the cover and with the outlet end of the barrel in alignment with the gas outlet opening formed in the front cover when the retention portion and the barrel are in a first state, and the retention portion being configured to not engage the barrel when the retention portion and the barrel are in a second state facilitating removal of the barrel from the back plate, the retention portion being coupled to the back plate when the retention portion and the barrel are in the second state.

2. The apparatus of claim 1, wherein the barrel is formed to include an outer flange located adjacent the outlet end and the back plate is formed to include an aperture configured to receive the flange of the barrel.

3. A gas outlet apparatus configured to provide a medical gas outlet for a gas supply line, the apparatus comprising:
    a front cover formed to include a gas outlet opening;
    a back plate coupled to the front cover;
    a gas outlet barrel having an inlet end, an outlet end, and a valve located between the inlet end and the outlet end; and
    a retention portion located on the back plate, the retention portion being configured to engage the barrel adjacent the outlet end to secure the barrel to the back plate and the cover and with the outlet end of the barrel in alignment with the gas outlet opening formed in the front cover when the retention portion and the barrel are in a first state, and the retention portion being configured to not engage the barrel when the retention portion and the barrel are in a second state facilitating removal of the barrel from the back plate, the barrel being formed to include an outer flange located adjacent the outlet end, the back plate being formed to include an aperture configured to receive the flange of the barrel, the retention portion including a latch plate coupled to the back plate, the latch plate being movable from a first position in which the latch plate engages the flange of the barrel to secure the barrel to the back plate to a second position in which the latch plate is spaced apart from the flange to permit removal of the barrel from the back plate.

4. The apparatus of claim 3, wherein the latch plate includes an elongated slot, and further comprising a fastener extending through the elongated slot for coupling the latch plate to the back plate.

5. The apparatus of claim 3, further comprising a fastener configured to couple the latch plate to the back plate, the fastener being movable from a first position to secure the latch plate to the back plate to a second position to permit movement of the latch plate relative to the back plate to permit installation and removal of the barrel from the back plate without removing the fastener.

6. The apparatus of claim 3, wherein the latch plate includes and inwardly projecting edge configured to engage the flange of the barrel.

7. A gas outlet apparatus configured to provide a medical gas outlet for a gas supply line, the apparatus comprising:
    a front cover formed to include a gas outlet opening;
    a back plate coupled to the front cover;
    a gas outlet barrel having an inlet end, an outlet end, and a valve located between the inlet end and the outlet end; and
    a retention portion located on the back plate, the retention portion being configured to engage the barrel adjacent the outlet end to secure the barrel to the back plate and the cover and with the outlet end of the barrel in alignment with the gas outlet opening formed in the front cover when the retention portion and the barrel are in a first state, and the retention portion being configured to not engage the barrel when the retention portion and the barrel are in a second state facilitating removal of the barrel from the back plate, the barrel being formed to include an outer flange located adjacent the outlet end, the back plate being formed to include an aperture configured to receive the flange of the barrel, the barrel having a non-symmetrical flange, the back plate being formed to include a non-symmetrical opening, a portion of the back plate being configured to engage the flange upon rotation of the barrel to secure the barrel to the back plate.

8. A gas outlet apparatus configured to provide a medical gas outlet for a gas supply line, the apparatus comprising:

a front cover formed to include a gas outlet opening;

a back plate coupled to the front cover;

a gas outlet barrel having an inlet end, an outlet end, and a valve located between the inlet end and the outlet end; and a retention portion located on the back plate, the retention portion being configured to engage the barrel adjacent the outlet end to secure the barrel to the back plate and the cover and with the outlet end of the barrel in alignment with the gas outlet opening formed in the front cover when the retention portion and the barrel are in a first state, and the retention portion being configured to not engage the barrel when the retention portion and the barrel are in a second state facilitating removal of the barrel from the back plate, the barrel being formed to include an outer flange located adjacent the outlet end, the back plate being formed to include an aperture configured to receive the flange of the barrel, the aperture formed in the back plate being defined by first and second curved side walls, a flat top wall, and a flat bottom wall, the flange of the barrel including a flat top portion sized for insertion past the flat top wall and the first and second side walls of the back plate, rotation of the barrel causing a portion of the flange to be engaged by the back plate adjacent the flat top wall to couple the barrel to the back plate.

9. A gas outlet apparatus configured to provide a medical gas outlet for a gas supply line, the apparatus comprising:

a front cover formed to include a gas outlet opening;

a back plate coupled to the front cover;

a gas outlet barrel having an inlet end, an outlet end, and a valve located between the inlet end and the outlet end; and a retention portion located on the back plate, the retention portion being configured to engage the barrel adjacent the outlet end to secure the barrel to the back plate and the cover and with the outlet end of the barrel in alignment with the gas outlet opening formed in the front cover when the retention portion and the barrel are in a first state, and the retention portion being configured to not engage the barrel when the retention portion and the barrel are in a second state facilitating removal of the barrel from the back plate, the barrel being formed to include an outer flange located adjacent the outlet end, the back plate being formed to include an aperture configured to receive the flange of the barrel, the aperture formed in the back plate being formed to include a tab, the flange of the barrel being formed to include a slot sized to fit over the tab so that the flange lies between the back wall and the front cover, rotation of the barrel causing a portion of the flange to be engaged by the tab to secure the barrel to the back plate.

10. A gas outlet apparatus configured to provide a medical gas outlet for a gas supply line, the apparatus comprising:

a front cover formed to include a gas outlet opening;

a back plate coupled to the front cover;

a gas outlet barrel having an inlet end, an outlet end, and a valve located between the inlet end and the outlet end; and means for coupling the barrel to the back plate and the cover with the outlet end of the barrel in alignment with the gas outlet opening formed in the front cover, the coupling means permitting the barrel to be removed from the back plate without uncoupling any fasteners from both the back plate and the barrel.

11. The apparatus of claim 10, wherein the barrel is formed to include an outer flange located adjacent the outlet end and the back plate is formed to include an aperture configured to receive the flange of the barrel.

12. The apparatus of claim 11, wherein the aperture formed in the back plate is defined by first and second curved side walls, a flat top wall, and a flat bottom wall, and the flange of the barrel includes a top flat portion sized for insertion past the flat top wall and the first and second side walls of the back plate, rotation of the barrel causing a portion of the flange to be engaged by the back plate adjacent the top flat wall to couple the barrel to the back plate.

13. The apparatus of claim 11, wherein the aperture formed in the back plate is formed to include a tab and the flange of the barrel is formed to include a slot sized to fit over the tab so that the flange lies between the back wall and the front cover, rotation of the barrel causing a portion of the flange to be engaged by the tab to secure the barrel to the back plate.

14. The apparatus of claim 11, wherein the coupling means includes a latch plate coupled to the back plate, the latch plate being movable from a first position to engage the flange of the barrel to secure the barrel to the back plate to a second position spaced apart from the flange to permit removal of the barrel from the back plate.

15. The apparatus of claim 14, wherein the latch plate includes an elongated slot, and the coupling means includes a fastener extending through the elongated slot for coupling the latch plate to the back plate.

16. The apparatus of claim 14, wherein the coupling means includes a fastener configured to couple the latch plate to the back plate, the fastener being movable from a first position to secure the latch plate to the back plate to a second position to permit movement of the latch plate relative to the back plate to permit installation and removal of the barrel from the back plate without removing the fastener.

17. The apparatus of claim 14, wherein the latch plate includes and inwardly projecting edge configured to engage the flange of the barrel.

18. The apparatus of claim 10, wherein the coupling means includes a non-symmetrical flange flange formed on the barrel and a non-symmetrical opening formed in the back plate, a portion of the back plate being configured to engage the flange upon rotation of the barrel to secure the barrel to the back plate.

19. The apparatus of claim 10, wherein the coupling means includes a coupling element supported by the back plate for movement relative to the back plate between a first portion in which the coupling element engages the barrel to secure the barrel to the back plate and a second position in which the coupling element disengages the barrel to release the barrel from the back plate.

20. The apparatus of claim 10, wherein the coupling means includes a first coupling element that remains fixed to the back plate and a second coupling element that remains fixed to the barrel and the first and second coupling elements are movable relative to one another between a first position in which the first and second coupling elements engage one another to secure the barrel to the back plate and a second position in which the first and second coupling elements disengage one another to release the barrel from the back plate.

21. A gas outlet apparatus configured to provide a medical gas outlet for a gas supply line, the apparatus comprising:

a front cover formed to include a gas outlet opening;

a back plate coupled to the front cover;

a gas outlet barrel having an inlet end, an outlet end, a side wall extending from the inlet end to the outlet end and defining an interior passage, and a valve disposed in the interior passage to allow gas to flow through the interior passage to the gas outlet opening upon opening of the valve, a fastener, and a latch plate movable relative to the back plate between a first position in which the latch plate engages the barrel to secure the barrel to the back plate and a second position in which the latch plate disengages the barrel to allow removal of the barrel from the back plate, the latch plate being coupled to the fastener and the fastener being coupled to the back plate during movement of the latch plate from its first position to its second position.

22. The apparatus of claim 21, wherein the latch plate includes a slot and a fastener extends through the slot so that the fastener restricts movement of the latch plate relative to the back plate during movement of the latch plate from its first position to its second position.

23. The apparatus of claim 21, wherein the barrel includes an outer flange extending away from the side wall and the outer flange engages the back plate and the latch plate.

24. The apparatus of claim 23, wherein the outer flange includes a first surface facing toward the front cover and a second surface facing away from the front cover, the latch plate includes an edge facing toward the front cover, and the first surface engages the back plate and the edge of the latch plate.

25. The apparatus of claim 21, wherein the latch plate engages the back plate and the fastener when the latch plate is in its first position.

26. A gas outlet apparatus configured to provide a medical gas outlet for a gas supply line, the apparatus comprising:

a front cover formed to include a gas outlet opening, a back plate coupled to the front cover, the back plate including an inner edge that defines an opening, a gas outlet barrel having an inlet end, an outlet end, a side wall extending from the inlet end to the outlet end and defining an interior passage, a valve disposed in the interior passage to allow gas to flow through the interior passage to the gas outlet opening upon opening of the valve, and a flange coupled to the side wall, the flange and the inner edge cooperating so that the flange, in a first portion, can move through the opening defined by the inner edge and, in a second position, engages the back plate in response to rotation of the flange relative to the back plate to secure the barrel to the back plate.

27. The apparatus of claim 26, wherein the flange includes a perimeter edge including an arcuate portion and a straight portion that forms a chord of the arcuate portion, the aperture formed in the back plate includes an arcuate portion and a straight portion, the straight portion of the flange and the straight portion of the aperture are parallel to one another in the first position and are non-parallel to one another in the second position.

28. The apparatus of claim 26, wherein each of the flange and the back plate includes a first surface facing toward the front cover and a second surface facing away from the front cover and the second surface of the flange engages the first surface of the back plate when the flange is in the first position.

29. The apparatus of claim 26, wherein the flange is formed to include a slot, the back plate includes a tab that is coupled to the inner edge and extends into the opening, and the flange cooperates with the tab so that the tab passes through the slot upon movement of the flange through the opening.

30. The apparatus of claim 29, wherein the flange includes a first end and a second end that is spaced apart from and faces toward the first end to form the slot.

\* \* \* \* \*